United States Patent
Jennas, II et al.

(10) Patent No.: US 8,683,485 B2
(45) Date of Patent: *Mar. 25, 2014

(54) EVENLY DISTRIBUTING WORKLOAD AND PROVIDING A PREDICTABLE FAILOVER SCENARIO IN A DATA REPLICATION SYSTEM

(75) Inventors: Paul Anthony Jennas, II, Tucson, AZ (US); Jason Lee Peipelman, Tucson, AZ (US); Joshua Marshall Rhoades, Tucson, AZ (US); David Montgomery, Tucson, AZ (US); Philip Matthew Doatmas, Tucson, AZ (US); Michael Robert Groseclose, Jr., Tucson, AZ (US); Larry Juarez, Tucson, AZ (US); Todd Charles Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/448,234

(22) Filed: Apr. 16, 2012

(65) Prior Publication Data
US 2012/0290747 A1    Nov. 15, 2012

Related U.S. Application Data

(63) Continuation of application No. 12/582,502, filed on Oct. 20, 2009, now Pat. No. 8,479,210.

(51) Int. Cl.
*G06F 3/00* (2006.01)

(52) U.S. Cl.
USPC ........... 718/105; 711/100; 711/151; 711/154; 714/4.11; 714/6.3; 714/E11.098

(58) Field of Classification Search
USPC ............ 711/100, 151, 154; 714/4.11, 6.3, 714/E11.098
See application file for complete search history.

(56) References Cited

U.S. PATENT DOCUMENTS

| | | | |
|---|---|---|---|
| 4,970,710 A | 11/1990 | Lee et al. | |
| 5,633,999 A | 5/1997 | Clowes et al. | |
| 5,937,428 A * | 8/1999 | Jantz | 711/114 |
| 6,477,591 B1 | 11/2002 | VanderSpek | |

(Continued)

OTHER PUBLICATIONS

Bhattacharya, S., et al., "Hierarchical Extraction and Verification of Symmetry Constraints for Analog Layout Automation"; ACM-IEEE; pp. 400-410; 2004.

*Primary Examiner* — Jennifer To
*Assistant Examiner* — Abu Ghaffari
(74) *Attorney, Agent, or Firm* — Nelson and Nelson; Daniel P. Nelson; Alexis V. Nelson

(57) ABSTRACT

A method for more effectively distributing the I/O workload in a data replication system is disclosed herein. In selected embodiments, such a method may include generating an I/O request and identifying a storage resource group associated with the I/O request. In the event the I/O request is associated with a first storage resource group, the I/O request may be directed to a first storage device and a copy of the I/O request may be mirrored from the first storage device to a second storage device. Alternatively, in the event the I/O request is associated with a second storage resource group, the I/O request may be directed to a second storage device and a copy of the I/O request may be mirrored from the second storage device to the first storage device.

5 Claims, 8 Drawing Sheets

(56) References Cited

U.S. PATENT DOCUMENTS

| | | |
|---|---|---|
| 6,681,339 B2 | 1/2004 | McKean et al. |
| 7,043,665 B2 | 5/2006 | Kern et al. |
| 7,162,579 B2 * | 1/2007 | Horn et al. .................... 711/114 |
| 7,284,020 B2 * | 10/2007 | Shitomi et al. ........................ 1/1 |
| 7,376,859 B2 | 5/2008 | Boyd et al. |
| 7,467,168 B2 | 12/2008 | Kern et al. |
| 7,562,251 B1 | 7/2009 | Karr |
| 7,725,761 B2 | 5/2010 | Mizutani |
| 7,945,669 B2 | 5/2011 | Bober et al. |
| 2003/0014599 A1 | 1/2003 | McBrearty et al. |

* cited by examiner

EVENLY DISTRIBUTING WORKLOAD AND PROVIDING A PREDICTABLE FAILOVER SCENARIO IN A DATA REPLICATION SYSTEM

BACKGROUND

1. Field of the Invention

This invention relates to networking technology, and more particularly to apparatus and methods for distributing the I/O workload in a data replication system.

2. Background of the Invention

HyperSwap® is a feature of IBM's Geographically Dispersed Parallel Sysplex ("GDPS") technology that is used in Peer to Peer Remote Copy ("PPRC") environments. By design, HyperSwap® enhances the resilience of Parallel Sysplex by facilitating the immediate switching of PPRC storage systems. The current implementation of HyperSwap® directs all I/O requests to a single storage system.

For example, FIG. 1 shows one embodiment of a synchronous Peer-to-Peer Remote Copy ("PPRC") system 100 (also known as a "Metro Mirror" system 100) where the HyperSwap® feature may be implemented. In such a configuration, a host system 106 sends all I/O requests 108 to a primary storage device 104a. The I/O requests 108 may be executed on the primary storage device 104a (by reading or writing data on primary volumes 102a). The primary storage device 104a may mirror write requests 110 to a secondary storage device 104b. The secondary storage device 104b may execute the write request 110 (by writing the data to secondary volumes 102b) and return a write acknowledge signal 112 to the primary storage device 104a when the write completes.

Once a write has been performed on both the primary and secondary storage devices 104a, 104b, the primary storage device 104a may return a write acknowledge signal 114 to the host system 106. Thus, in this "synchronous" configuration, the host system 106 waits for the write to be performed on both the primary and secondary storage devices 104a, 104b before it receives an acknowledge signal 114. An I/O is considered complete when the I/O has successfully completed to both the primary and secondary storage devices 104a.

In the event the host system 106 is unable to communicate with the primary storage device 104a, the host system 106 may invoke the HyperSwap® feature to cause the host system 106 to directly communicate with the secondary storage device 104b. In essence, this will cause the secondary storage device 104b to become the new primary storage device and the primary storage device 104a to become the new secondary storage device. This process of switching the primary and secondary storage devices 104a, 104b may also be referred to as a "failover."

Regardless of whether the host 106 communicates directly with the primary storage device 104s or the secondary storage device 104b (thereby becoming the new primary storage device), the host system 106 distributes the workload using an "all-or-nothing" approach. That is, the host system 106 will direct all I/O to either one storage device 104a or the other 104b. Although effective, distributing the workload in this manner may not be ideal.

In view of the foregoing, what is needed is an apparatus and method for more evenly distributing the workload between storage devices in a data replication system (such as a PPRC environment). Ideally, such an apparatus and method would increase I/O performance, increase reliability, and provide a more predictable failover scenario. Beneficially, such an apparatus and method would provide continuous data availability and consistency in the event of a failure or disaster. Such a system is disclosed and claimed herein.

SUMMARY

The invention has been developed in response to the present state of the art and, in particular, in response to the problems and needs in the art that have not yet been fully solved by currently available apparatus and methods. Accordingly, the invention has been developed to provide apparatus and methods for more evenly distributing the workload in a data replication system. The features and advantages of the invention will become more fully apparent from the following description and appended claims, or may be learned by practice of the invention as set forth hereinafter.

Consistent with the foregoing, a method for more effectively distributing the I/O workload in a data replication system is disclosed herein. In selected embodiments, such a method may include generating an I/O request and identifying a storage resource group associated with the I/O request. In the event the I/O request is associated with a first storage resource group, the I/O request may be directed to a first storage device and a copy of the I/O request may be mirrored from the first storage device to a second storage device. Alternatively, in the event the I/O request is associated with a second storage resource group, the I/O request may be directed to a second storage device and a copy of the I/O request may be mirrored from the second storage device to the first storage device. In this way, the I/O workload may be more evenly distributed between the first and second storage devices.

A corresponding system, apparatus, and computer program product are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
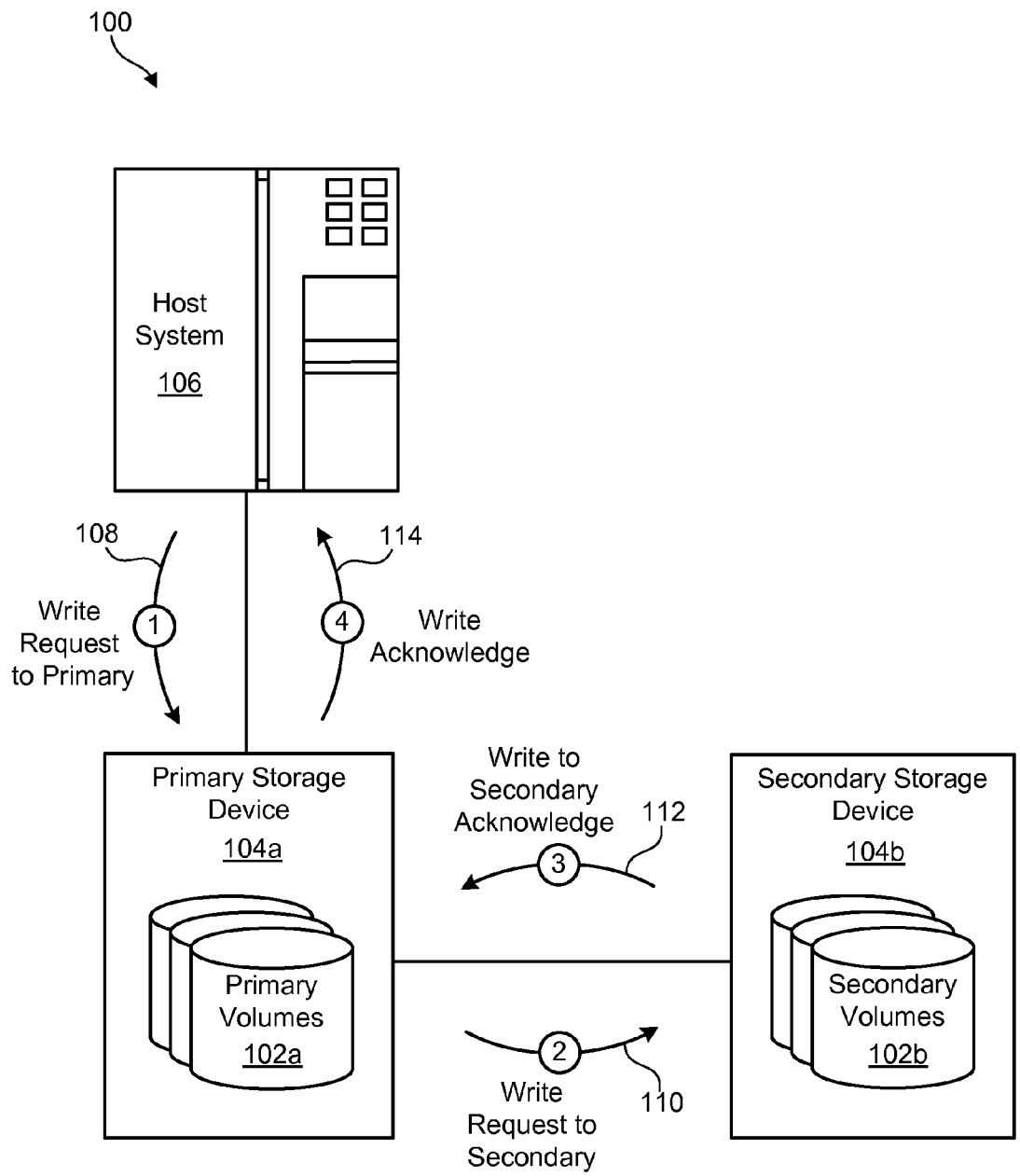
FIG. 1 is a high-level block diagram showing one example of a prior art PPRC system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer-program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer-usable mediums according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

As used herein, the term "storage resource group" refers to a group of one or more volumes, a group of one or more logical subsystems ("LSSs"), or other groups of data storage elements or resources. The term "logical subsystem" or "LSS" may be used to refer to groups of logical volumes or other resources. In certain embodiments, an LSS may contain up to a certain number (e.g., two hundred fifty-six) logical volumes.

Referring to FIG. 1, one embodiment of a conventional Peer-to-Peer Remote Copy ("PPRC") system 100 (also known as a "Metro Mirror" system 100) is shown. The PPRC system 100 is presented only by way of example to show an architecture on which embodiments of the invention might operate, and is not intended to be limiting. In general, the PPRC system 100 establishes a mirroring relationship between one or more primary volumes 102a and one or more secondary volumes 102b. Once this relationship is established, the volumes 102a, 102b may be updated substantially simultaneously. The primary and secondary volumes 102a, 102b may be located on the same storage device 104, although the volumes 102a, 102b are typically located on separate storage devices 104a, 104 b (i.e., primary and secondary storage devices 104a, 104b) located some distance (e.g., several miles to several hundreds of miles) from one another. Channel extension equipment may be located between the storage devices 104a, 104b, as needed, to extend the distance over which the storage devices 104a, 104b may communicate.

The PPRC system 100 may, in certain embodiments, be configured to operate in a synchronous manner. In this configuration, an I/O may be considered complete when the I/O has successfully completed to both the primary and secondary storage devices 104a, 104b. As an example, in such a configuration, a host system 106 may initially send a write request 108 to the primary storage device 104a. This write operation 108 may be performed on the primary storage device 104a and the primary storage device 104a may, in turn, transmit a write request 110 to the secondary storage device 104b. The secondary storage device 104b may execute the write operation 110 and return a write acknowledge signal 112 to the primary storage device 104a. Once the write has been performed on both the primary and secondary storage devices 104a, 104b, the primary storage device 104a may return a write acknowledge signal 114 to the host system 106.

Although the apparatus and methods disclosed herein will be discussed primarily in association with synchronous PPRC, the apparatus and methods may also be applicable, in various forms, to other analogous data replication technologies. Furthermore, the apparatus and methods are not limited to IBM applications, but may be applicable to any comparable or analogous data replication technology regardless of the manufacturer, product name, or components or component names associated with the technology. Any data replication technology that could benefit from one or more embodiments of the invention is deemed to fall within the scope of the invention. Thus, synchronous PPRC is presented by way of example and is not intended to be limiting.

Figure 2:
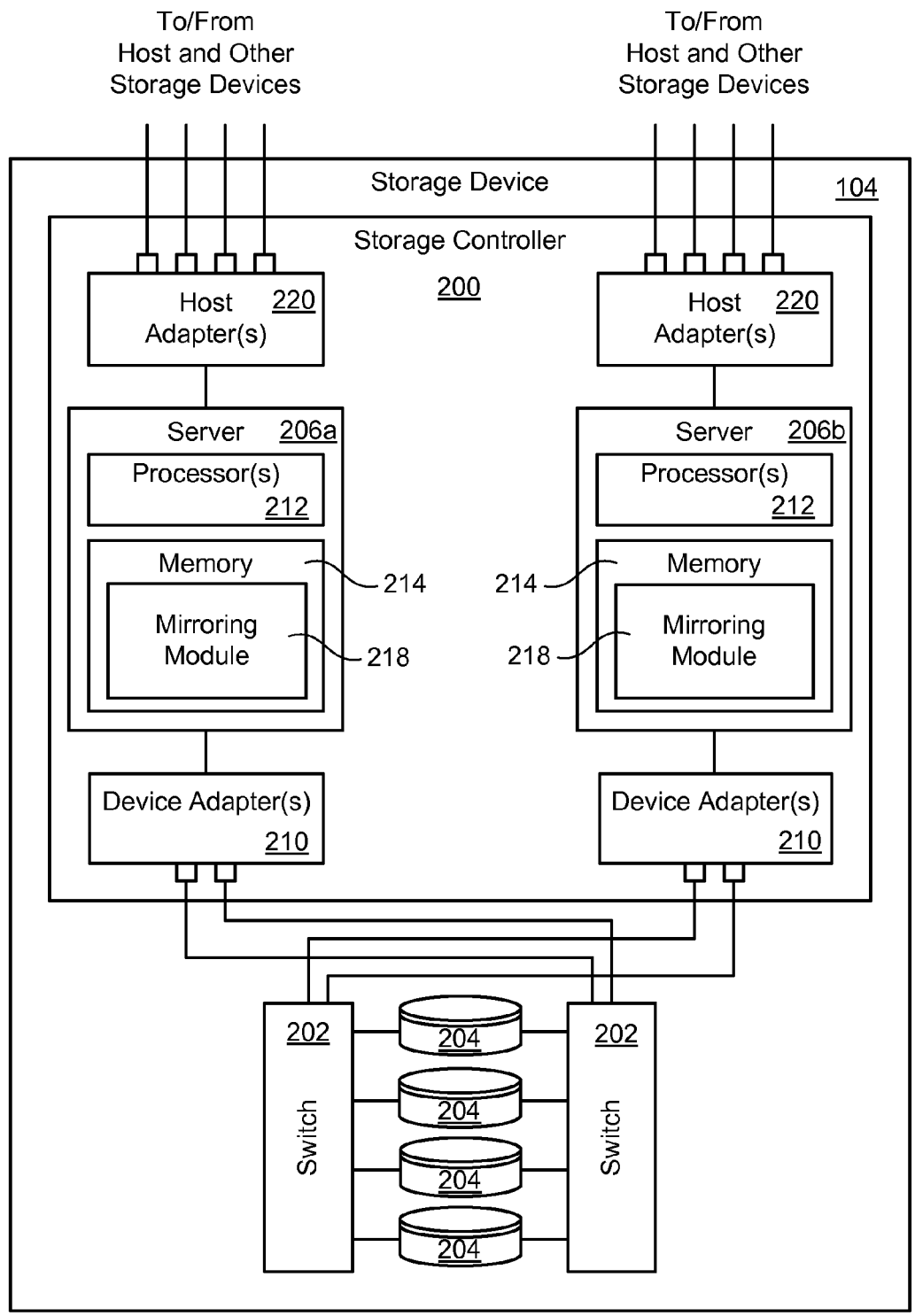
FIG. 2 is a high-level block diagram showing one non-limiting example of a storage device in accordance with certain embodiments of the invention.

Referring to FIG. 2, one embodiment of a storage device 104 (such as the primary or secondary storage device 104a, 104b) for use with embodiments of the invention is illustrated. This storage device 104 is provided only by way of example and is not intended to be limiting. In this example, the storage device 104 contains an array of hard-disk drives 204 and/or solid-state drives 204. As shown, the storage device 104 includes a storage controller 200, one or more switches 202, and storage media 204 such as hard-disk drives 204 or solid-state drives 204. The storage controller 200 may enable one or more hosts 106 (e.g., open system and/or mainframe servers 106) or storage devices 104 to access data in the storage media 204.

In selected embodiments, the storage controller 200 includes one or more servers 206. The storage controller 200 may also include host adapters 220 to connect to host devices 106 and storage devices 104. The storage controller 200 may also include device adapters 210 to connect to the storage media 204. Multiple servers 206a, 206b may provide redundancy to ensure that data is always available to connected hosts. Thus, when one server 206a fails, the other server 206b may remain functional to ensure that I/O is able to continue between the hosts 106 and the storage media 204. This process may be referred to as a "failover." One example of a storage device 104 having an architecture similar to that illustrated in FIG. 2 is the IBM DS8000™ enterprise storage system.

Nevertheless, embodiments of the invention are not limited to being implemented with the IBM DS8000™ enterprise storage system, but may be implemented in any comparable or analogous storage system 104, regardless of the manufacturer, product name, or components or component names associated with the system. Furthermore, any system 104 that could benefit from one or more embodiments of the invention is deemed to fall within the scope of the invention. Thus, the IBM DS8000™ is presented only by way of example and not limitation.

In selected embodiments, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The memory 214 may store software modules that run on the processor(s) 212 and are used to access data in the storage media 204. The servers 206 may host at least one instance of these software modules, which collectively may also be referred to as a "server," albeit in software form. These software modules may manage all read and write requests to logical volumes in the storage media 204.

In certain embodiments, the memory 214 may also store a mirroring module 218 to implement the PPRC functionality described herein. To provide this PPRC functionality, the mirroring module 218 may intercept write requests (and associated data) that are sent from the host system 106 to the storage device 104. In addition to executing the write request on the storage device 104, the mirroring module 218 may send the write request and associated data to another storage device 104b, as discussed in more detail below.

Figure 3:
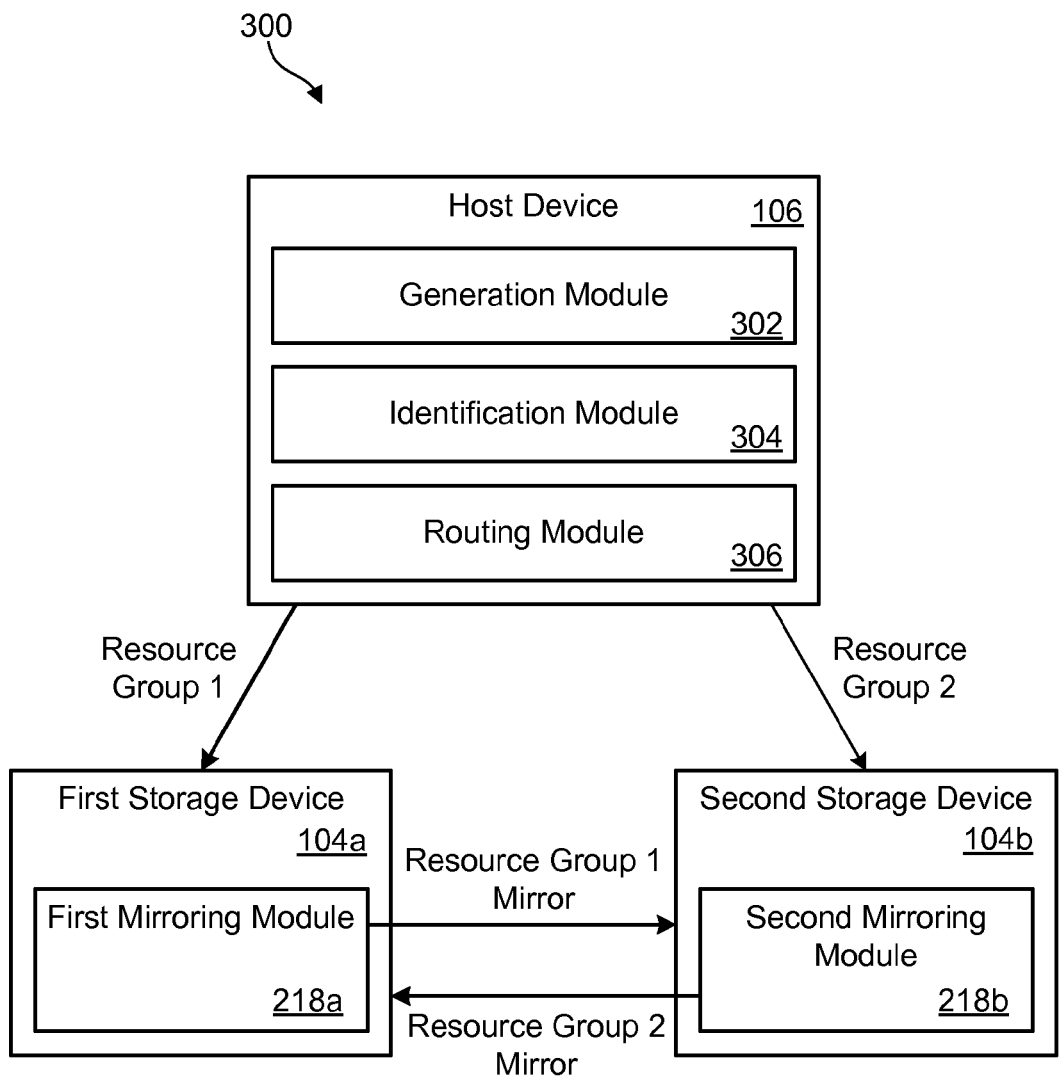
FIG. 3 is a high-level block diagram showing various modules that may be used to more evenly distribute the I/O workload in a data replication system.

Referring now to FIG. 3, a system 300 for more evenly distributing the I/O workload in a data replication system in accordance with the invention is illustrated. In selected embodiments, such a system 300 may include a generation module 302, an identification module 304, and a routing module 306, among other modules. The system 300 may also include mirroring modules 218 in each of the storage devices 104a, 104b, as will be discussed in more detail below.

In certain embodiments, the generation module 302, identification module 304 and routing module 306 may be embodied within the host device 106. The generation module 302 may be configured to generate an I/O request, such as a write request, that corresponds to a particular storage resource group (such as an LSS group or group of volumes). The identification module 304 may identify the storage resource group that is associated with the I/O request.

Once the storage resource group that is associated with the I/O request has been identified, the routing module 306 may direct the I/O request to the storage device 104 that is associated with the storage resource group. More specifically, in certain embodiments, a first storage device 104a may be associated with a first storage resource group (i.e., "Resource Group 1"). A second storage device 104b may be associated with a second resource group (i.e., "Resource Group 2"). If the identification module 304 determines that the I/O request corresponds to the first storage resource group, the routing module 306 may route the request to the first storage device 104a. Alternatively, if the identification module 304 determines that the I/O request corresponds to the second storage resource group, the routing module 306 may route the request to the second storage device 104b.

In other words, the host device 106 (via the routing module 306) may be configured to send I/O requests associated with a particular storage resource group to a particular storage device 104, as opposed to routing all I/O request to a single storage device 104 in the PPRC system. In this manner, embodiments of the invention may more evenly distribute the I/O workload among storage devices 104 connected to a particular host device 106. This will cause each storage device 104a, 104b to act as both a source and target for data mirroring purposes. As will become more evident from the discussion below, this configuration may increase I/O performance and reliability.

In certain embodiments, each storage device 104 may contain multiple servers 206, such as where each storage device 104a, 104b is an IBM DS8000™ enterprise storage system. In such embodiments, one server 206a in the storage device 104 may act as a source in a PPRC relationship, and the other server 206b may act as the target in a PPRC relationship. This configuration will be illustrated in more detail in association with FIGS. 4 and 5. In such embodiments, each server 104a may include a mirroring module 218 to intercept write requests and mirror them to a server 206 in the other storage device 104.

Figure 4:
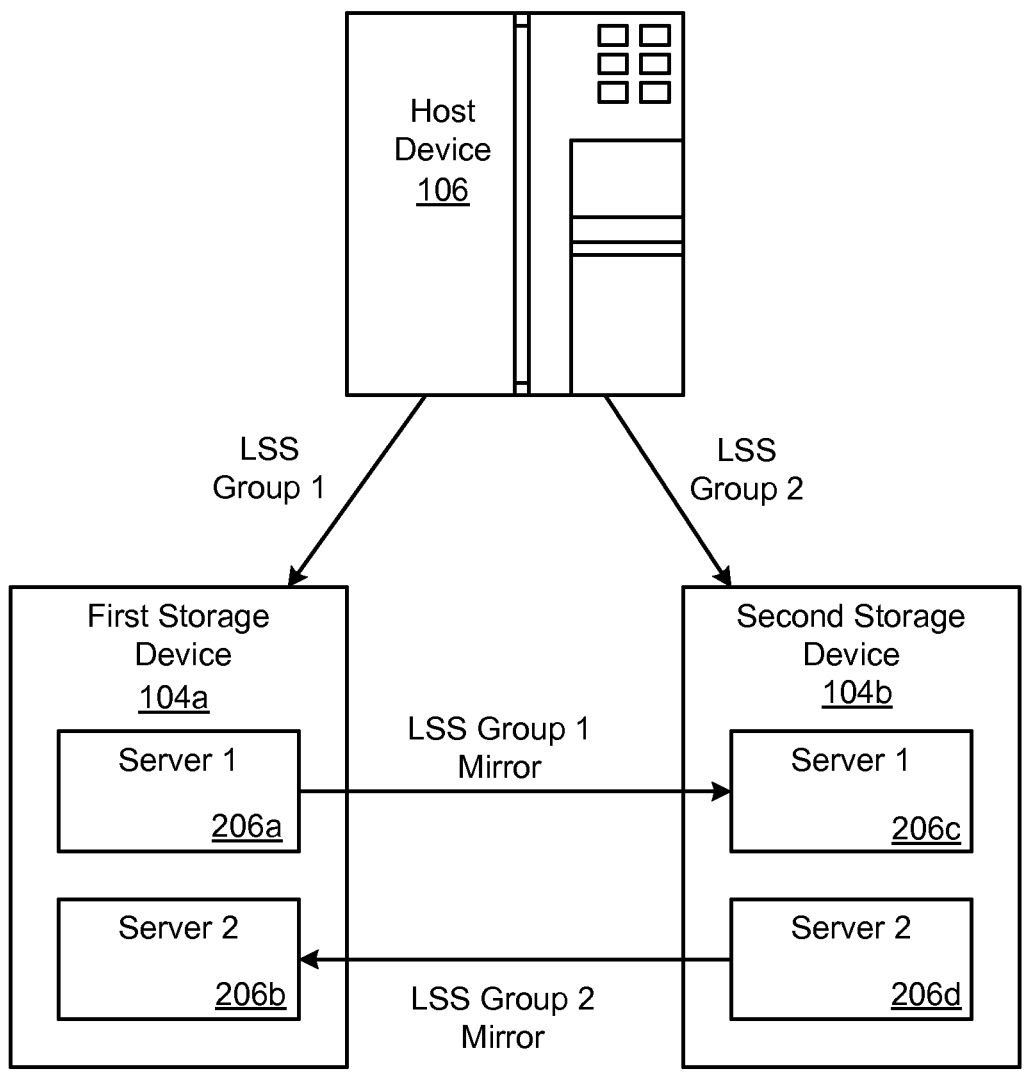
FIG. 4 is a high-level block diagram of one embodiment of a system for distributing the I/O workload.

Referring now to FIG. 4, in selected embodiments, a host device 106 may direct I/O traffic associated with a first storage resource group to a first storage device 104a, and direct I/O traffic associated with a second storage resource group to a second storage device 104b. As shown, the first storage resource group may include I/O traffic associated with a first LSS group ("LSS Group 1"), while the second storage resource group may include I/O traffic associated with a second LSS group ("LSS Group 2").

In operation, the host device 106 may generate an I/O request associated with one of the two LSS groups. The identification module 304 may identify the particular LSS group associated with the I/O request. The routing module 306 may utilize this information to direct the I/O request to the appropriate storage device 104. That is, if the I/O request is associated with the first LSS group, the routing module 306 will direct the I/O request to the first storage device 104a. Conversely, if the I/O request is associated with the second LSS group, the routing module 306 will direct the I/O request to the second storage device 104b.

In the illustrated embodiment, each of the storage devices 104a, 104b includes multiple servers 206. In this example, Server 1 206a in the first storage device 104a may receive and execute write requests for LSS Group 1 and mirror the write requests to Server 1 206c in the second storage device 104b. Similarly, Server 2 206d in the second storage device 104b may receive and execute write requests for LSS Group 2 and mirror the write requests to Server 2 206b in the first storage device 104a. In this way, each server 206 in a storage device 104 is configured to handle I/O traffic for a different LSS group. In other embodiments, the I/O traffic from a particular LSS group may not be limited to a particular server 206, but may be distributed across both servers 206 in a storage device 104.

Figure 5:
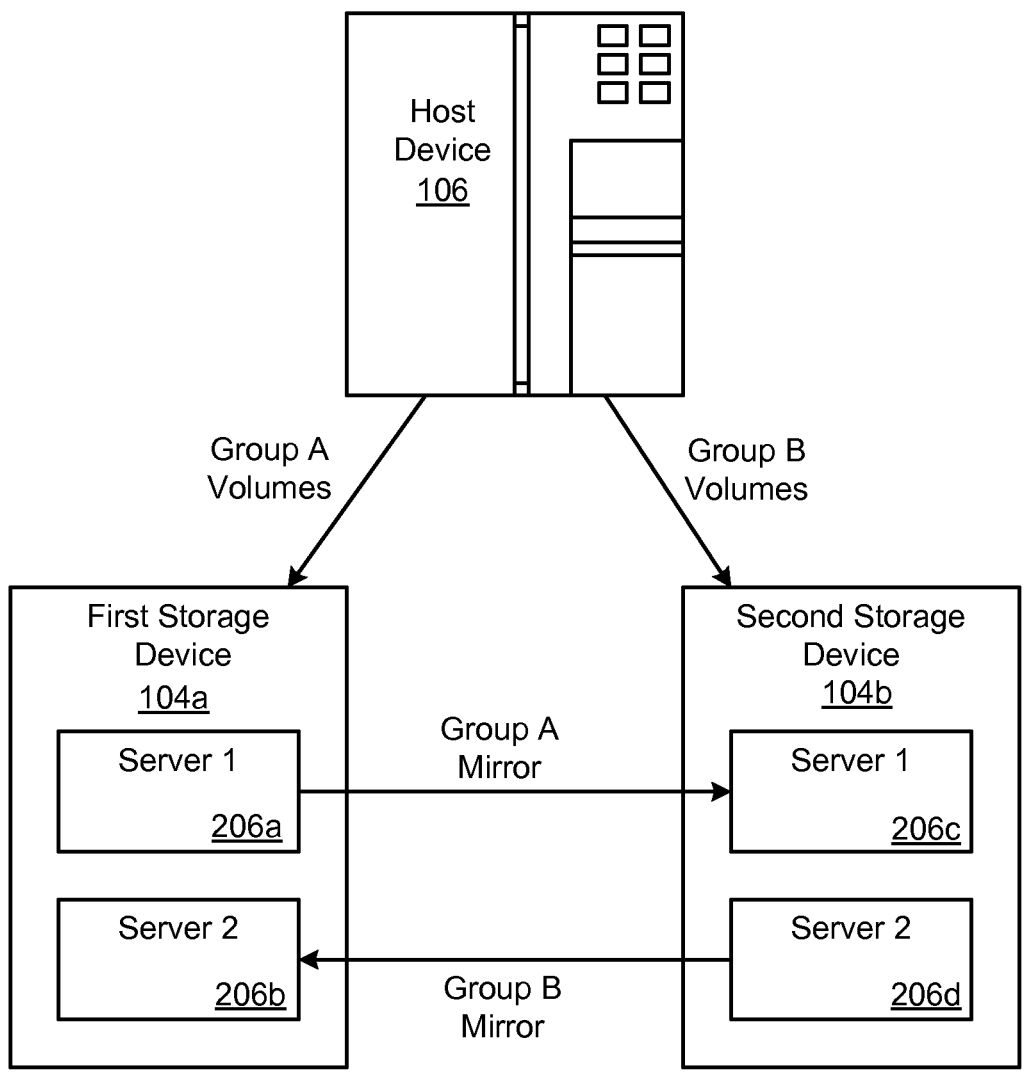
FIG. 5 is a high-level block diagram of an alternative embodiment of a system for distributing the I/O workload.

Referring now to FIG. 5, in another embodiment, the host device 106 may be configured to direct I/O traffic based on a group of volumes associated with the I/O, rather than an LSS group associated with the I/O. For example, as shown in FIG. 5, a host device 106 may direct I/O requests associated with a first group of volumes ("Group A Volumes") to a first storage device 104a, and direct I/O requests associated with a second group of volumes ("Group B Volumes") to a second storage device 104b.

In operation, the host device 106 may generate an I/O request associated with one of the two groups of volumes. The identification module 304 may then identify the particular group of volumes associated with the I/O request. The routing module 306 may utilize this information to direct the I/O request to the appropriate storage device 104. That is, if the I/O request is associated with the first group of volumes, the routing module 306 will direct the I/O request to the first storage device 104a. Conversely, if the I/O request is associated with the second group of volumes, the routing module 306 will direct the I/O request to the second storage device 104b.

Like the previous example, each of the storage devices 104a, 104b includes multiple servers 206. In this example, Server 1 206a in the first storage device 104a may receive and execute write requests for Group A Volumes and mirror the write requests to Server 1 206c in the second storage device 104b. Similarly, Server 2 206d in the second storage device 104b may receive and execute write requests for Group B Volumes and mirror the write requests to Server 2 206b in the first storage device 104a. In this way, each server 206 in a storage device 104 is configured to handle I/O traffic for a different group of volumes.

In other embodiments, the I/O traffic from a particular group of volumes may not be limited to a particular server but may be distributed across both servers 206 in the storage device 104. For example, certain requests associated with Group A Volumes may be routed to a server 206a ("Server 1") of the first storage device 104a and mirrored to a server 206c ("Server 1") of the second storage device 104b, while other requests associated with Group A Volumes may be routed to the other server 206b ("Server 2") of the first storage device 104a and mirrored to the other server 206d ("Server 2") of the second storage device 104b. Likewise, I/O requests associated with Group B Volumes may be executed by either server 206c, 206d in the second storage device 104b and mirrored to the corresponding server 206a, 206b in the first storage device 104a.

Figure 6:
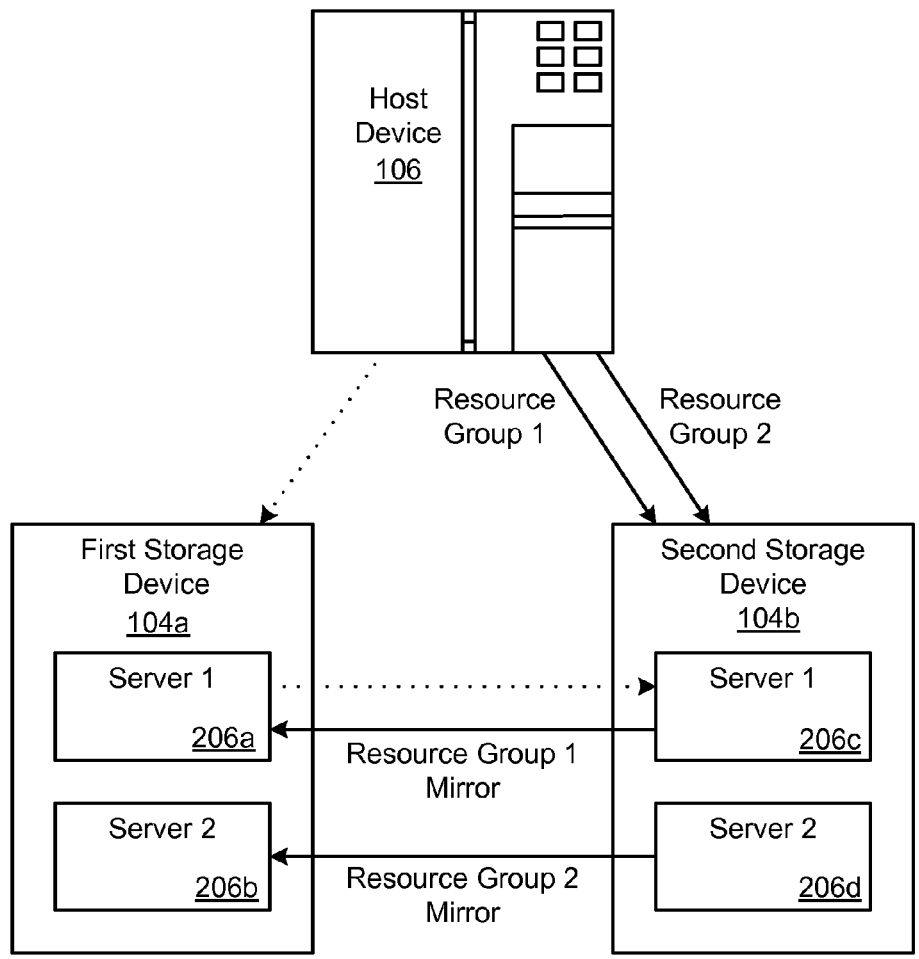
FIG. 6 is a high-level block diagram showing one failover scenario for a data replication system in accordance with the invention.

Referring now to FIG. 6, one benefit of the configuration illustrated in FIGS. 3 through 6 is that it may lead to more predictable failover scenarios. For example, as shown in FIG. 6, a first type of failover scenario may occur if communication is lost between the host device 106 and the first storage device 104a. The dotted lines show the communication paths that would be at least temporarily eliminated as a result of such a loss of communication.

In conventional PPRC environments (as shown in FIG. 1), such a loss of communication would likely cause the host system 106 to invoke the HyperSwap® feature, thereby causing the host system 106 to directly communicate with the second storage device 104b. This would cause the second storage device 104b to become the new primary storage device and the first storage device 104a to become the secondary storage device. This scenario would cause all of the I/O to be redirected from the host device 106 to the second storage device 104b.

In the illustrated embodiment, however, only half of the I/O may be redirected as a result of the same loss of communication. That is, the I/O associated with Resource Group 1 may be redirected to the second storage device 104b. Server 1 206c in the second storage device 104b may then mirror the I/O to Server 1 206a in the first storage device 104a. In effect, this would reverse the roles of Server 1 in both storage devices 104a, 104b, rendering Server 1 206c in the second storage device 104b the source, and Server 1 206a in the first storage device 104a the target. On the other hand, communication between Server 2 206d in the second storage device 104 and Server 2 206b in the first storage device 104a may remain the same. Thus, in this failover scenario, only half of the I/O may be redirected.

Figure 7:
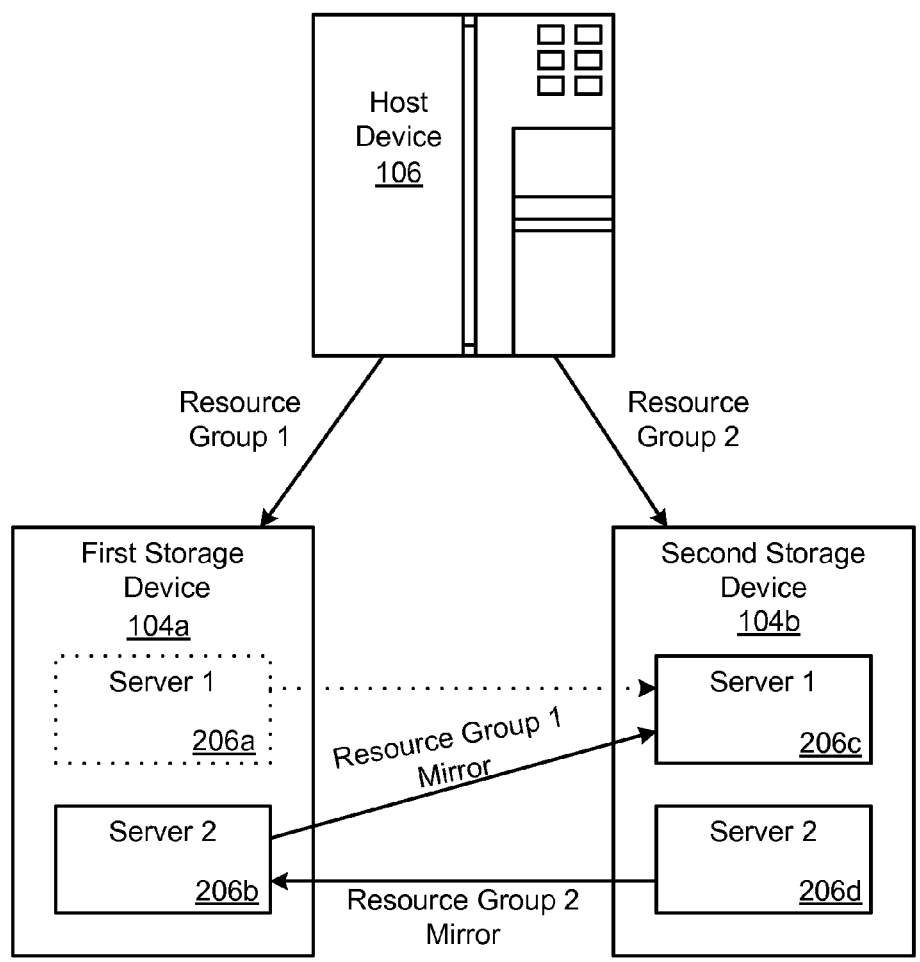
FIG. 7 is a high-level block diagram showing another failover scenario for a data replication system in accordance with the invention.

FIG. 7 illustrates a second type of failover scenario wherein a server 206a in the first storage device 104a fails, or otherwise ceases to function. The dotted lines show the server 206a that has failed, as well as the communication link that is eliminated as a result of the failure.

In a conventional PPRC environment (shown in FIG. 1), such a failure would likely cause the host system 106 to invoke the HyperSwap® feature and thereby directly communicate with the second storage device 104b. Like the previous example, this would cause the second storage device 104b to become the new primary storage device and the first storage device 104a to become the new secondary storage device. The new secondary storage device 104a would then function in a degraded manner, since one of the servers would be non-functional. This scenario, like the previous scenario, would also cause all of the I/O to be redirected.

In the illustrated embodiment, however, the system may continue to function without redirecting the I/O. In other words, the host 106 may not necessarily need to redirect I/O to the second storage device 104b in the event the server 206a fails. For example, in the event Server 1 206a in the first storage device 104a fails, I/O associated with Resource Group 1 may be handled by Server 2 206b in the first storage device 104a. This server 206b may then mirror I/O for Resource Group 1 to Server 1 206c in the second storage device 104b. At the same time, Server 1 206a in the first storage device 104a may also be the target for I/O associated with Resource Group 2. Thus, Server 2 206b in the first storage device 104a may act as both a source and a target. In this way, the first and second storage devices 104a, 104b may continue to operate in the conventional manner (without invoking the Hyperswap® feature), even though the first storage device 104*a* may function in a degraded manner (by having only one operable server 206*b*). This may eliminate the need for the host device 106 to invoke the Hyperswap® feature in the event a single server 206*a* fails.

Figure 8:
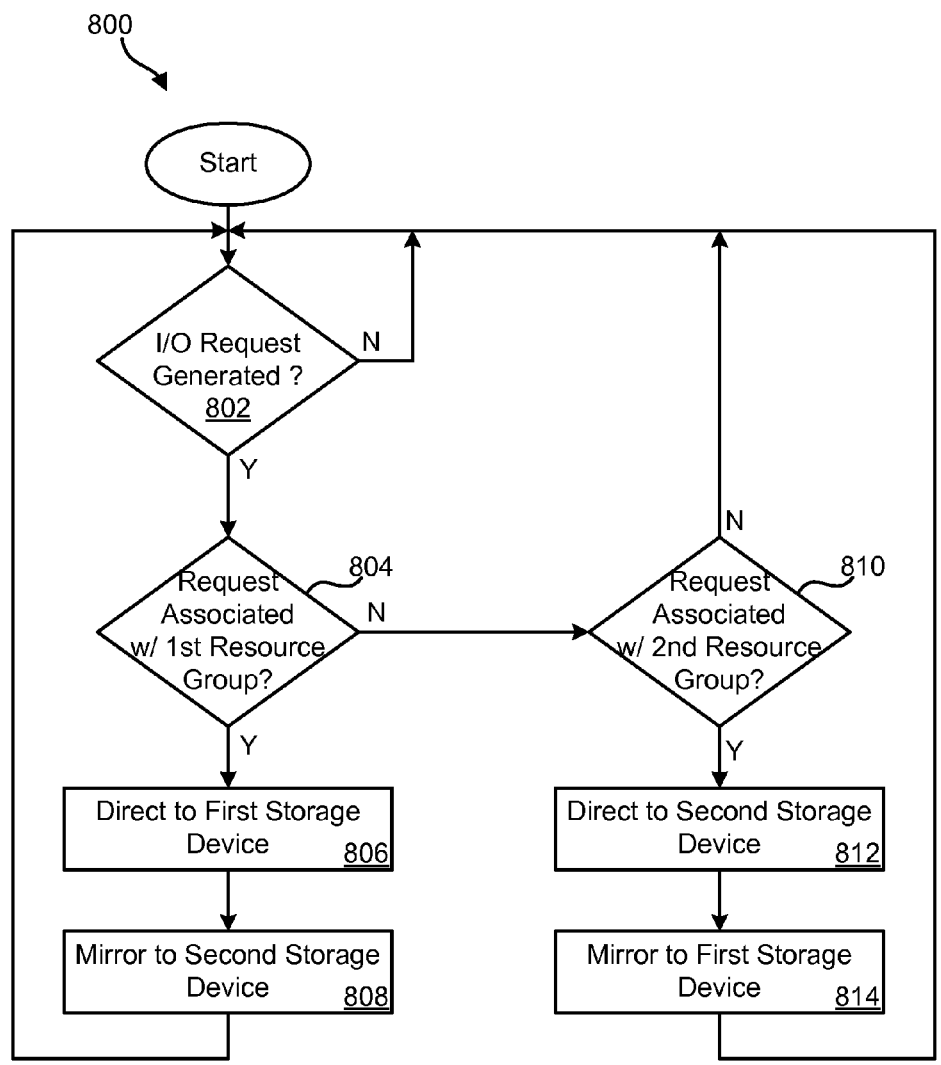
FIG. 8 is a flow chart illustrating one embodiment of a method for distributing the I/O workload in a data replication system in accordance with the invention.

Referring now to FIG. 8, one embodiment of a method 800 for distributing the I/O workload in a data replication system is illustrated. In certain embodiments, such a method 800 may include initially determining 802 whether an I/O request has been generated. If an I/O request has been generated, the method 800 may determine 804 which storage resource group (e.g., LSS group or group of volumes) is associated with the I/O request. If the I/O request is associated 804 with a first storage resource group, the method 800 may direct 806 the I/O request to a first storage device 104*a*. The I/O request may then be mirrored 808 from the first storage device 104*a* to a second storage device 104*b*.

If, on the other hand, the I/O request is associated 810 with a second storage resource group, the method 800 may direct 812 the I/O request to the second storage device 104*b*. The I/O request may then be mirrored 814 from the second storage device 104*b* to the first storage device 104*a*. The method 800 may continue by waiting 802 for the next I/O request and repeating the steps previously described.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for distributing load in a data replication system comprising a first storage device and a second storage device, the method comprising:

generating an I/O request for processing in one of a first storage resource group and a second storage resource group;

directing the I/O request to the first storage device and mirroring a copy of the I/O request to the second storage device in the event the I/O request is to be processed in the first storage resource group; and directing the I/O request to the second storage device and mirroring a copy of the I/O request to the first storage device in the event the I/O request is to be processed in the second storage resource group;

in the event the I/O request is to be processed in the first storage resource group but communication with the first storage device fails, redirecting the I/O request to the second storage device; and in the event the I/O request is to be processed in the second storage resource group but communication with the second storage device fails, redirecting the I/O request to the first storage device.

2. The method of claim 1, wherein the first storage resource group comprises a first logical subsystem ("LSS") group and the second storage resource group comprises a second logical subsystem ("LSS") group.

3. The method of claim 1, wherein the first storage resource group comprises a first group of logical volumes and the second storage resource group comprises a second group of logical volumes.

4. The method of claim 1, wherein:

directing the I/O request to the first storage device and mirroring a copy of the I/O request to the second storage device comprises directing the I/O request to a first server in the first storage device and mirroring a copy of the I/O request to a first server in the second storage device, wherein the first servers are associated with the first storage resource group; and directing the I/O request to the second storage device and mirroring a copy of the I/O request to the first storage device comprises directing the I/O request to a second server in the second storage device and mirroring a copy of the I/O request to a second server in the first storage device, wherein the second servers are associated with the second storage resource group.

5. The method of claim 1, wherein each of the first storage resource group and the second storage resource group contains an equal number of resources.

* * * * *